(12) United States Patent
Addiego et al.

(10) Patent No.: US 10,011,503 B2
(45) Date of Patent: Jul. 3, 2018

(54) METHOD FOR MAKING ACTIVATED CARBON-SUPPORTED TRANSITION METAL-BASED NANOPARTICLES

(71) Applicant: Corning Incorporated, Corning, NY (US)

(72) Inventors: William Peter Addiego, Big Flats, NY (US); Benedict Yorke Johnson, Horseheads, NY (US); Lingyan Wang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 119 days.

(21) Appl. No.: 14/337,621

(22) Filed: Jul. 22, 2014

(65) Prior Publication Data

US 2016/0023921 A1  Jan. 28, 2016

(51) Int. Cl.

| | |
|---|---|
| *C01B 31/08* | (2006.01) |
| *C02F 1/28* | (2006.01) |
| *B01D 15/26* | (2006.01) |
| *B01J 20/02* | (2006.01) |
| *B01J 20/06* | (2006.01) |
| *B01J 20/20* | (2006.01) |
| *B01J 20/28* | (2006.01) |
| *B01J 20/30* | (2006.01) |
| *B01J 20/32* | (2006.01) |
| *C02F 101/10* | (2006.01) |
| *C02F 101/20* | (2006.01) |
| *C02F 101/22* | (2006.01) |
| *C02F 103/00* | (2006.01) |
| *C02F 103/02* | (2006.01) |
| *C02F 103/06* | (2006.01) |
| *B01J 37/08* | (2006.01) |
| *B01J 37/16* | (2006.01) |
| *B01J 21/18* | (2006.01) |
| *B01J 23/745* | (2006.01) |
| *B01J 37/02* | (2006.01) |
| *C02F 103/18* | (2006.01) |

(52) U.S. Cl.
CPC ............ *C02F 1/283* (2013.01); *B01D 15/265* (2013.01); *B01J 20/02* (2013.01); *B01J 20/0229* (2013.01); *B01J 20/06* (2013.01); *B01J 20/20* (2013.01); *B01J 20/28007* (2013.01); *B01J 20/28016* (2013.01); *B01J 20/28023* (2013.01); *B01J 20/28042* (2013.01); *B01J 20/28045* (2013.01); *B01J 20/3078* (2013.01); *B01J 20/3204* (2013.01); *B01J 20/3236* (2013.01); *C02F 1/288* (2013.01); *B01J 21/18* (2013.01); *B01J 23/745* (2013.01); *B01J 37/0201* (2013.01); *B01J 37/088* (2013.01); *B01J 37/16* (2013.01); *C02F 2101/103* (2013.01); *C02F 2101/106* (2013.01); *C02F 2101/20* (2013.01); *C02F 2101/22* (2013.01); *C02F 2103/00* (2013.01); *C02F 2103/02* (2013.01); *C02F 2103/06* (2013.01); *C02F 2103/18* (2013.01); *C02F 2305/08* (2013.01)

(58) Field of Classification Search
CPC ........................................................ B01J 20/20
See application file for complete search history.

(56) References Cited

U.S. PATENT DOCUMENTS

| | | | | |
|---|---|---|---|---|
| 5,126,310 | A * | 6/1992 | Golden | B01J 20/32 423/245.1 |
| 6,171,372 | B1 * | 1/2001 | Ichiki | B01D 53/02 423/239.1 |
| 6,787,034 | B2 | 9/2004 | Noland et al. | 210/610 |
| 7,425,521 | B2 * | 9/2008 | Kaiser | B01D 53/02 423/460 |
| 7,429,551 | B2 | 9/2008 | Vo | |
| 7,459,086 | B2 | 12/2008 | Gaid | 210/667 |
| 8,097,185 | B2 | 1/2012 | Miller et al. | 252/506 |
| 8,097,559 | B2 | 1/2012 | Noland et al. | 502/406 |
| 8,618,021 | B2 | 12/2013 | Noland et al. | 502/406 |
| 2011/0139726 | A1 | 6/2011 | Jin et al. | 210/748.08 |
| 2011/0174743 | A1 | 7/2011 | Huang | 210/758 |

(Continued)

FOREIGN PATENT DOCUMENTS

| | | |
|---|---|---|
| CN | 101481155 B1 | 3/2011 |
| CN | 101531418 B | 4/2011 |

(Continued)

OTHER PUBLICATIONS

L.B. Hoch, et al., "Carbothermal Synthesis of Carbon-supported Nanoscale Zero-valent Iron Particles for the Remediation of Hexavalent Chromium", Environmental Science & Technology, 2008, vol. 42, pp. 2600-2605.

M. Yuan, et al., "Preparation and Characterization of Fe/SiO2 core/shell nanocomposites", Transactions of Nonferrous Metals Society of China, 2010, vol. 20, No. 4, pp. 632-636.

Y. Li, et al., "A novel and simple method to synthesize SiO2-coated Fe nanocomposites with enhanced Cr (VI) removal under various experimental conditions", 2012, vol. 288: pp. 118-125

Choi et al; "Synthesis of Reactive Nano-Fe/Pd Bimetallic System-Impregnated Activated carbon for the simultaneous adsorption and dechlorinatoin of PCBs"; Chem Mater. 2008, 20, 3649-3655.

(Continued)

*Primary Examiner* — Stuart Hendrickson (74) *Attorney, Agent, or Firm* — Dinsmore & Shohl LLP (57) ABSTRACT

Methods for making activated carbon-supported transition metal-based nanoparticles include (a) impregnated activated carbon with at least one transition metal-containing compound, and (b) heating the impregnated activated carbon at a temperature and for a time sufficient to carbothermally reduce the transition metal-containing compound. Also disclosed are activated carbon-supported transition metal-based nanoparticles produced by such methods. Further disclosed are methods for treating water and waste streams that include contacting the water or waste streams with the activated carbon-supported transition metal-based nanoparticles.

9 Claims, 4 Drawing Sheets

(56) References Cited

U.S. PATENT DOCUMENTS

| | | | |
|---|---|---|---|
| 2012/0208026 A1 | 8/2012 | Zhou et al. | 428/404 |
| 2013/0058724 A1 | 3/2013 | John et al. | 405/128.5 |
| 2013/0157055 A1 | 6/2013 | Jenneskens et al. | 428/403 |
| 2014/0091254 A1 | 4/2014 | Noland et al. | 252/175 |

FOREIGN PATENT DOCUMENTS

| | | |
|---|---|---|
| CN | 202195977 | 4/2012 |
| DE | 102010028550 | 11/2010 |
| KR | 2010097490 | 9/2010 |

OTHER PUBLICATIONS

Kakavandi et al; "Synthesis and properties of Fe3O4-activated carbon magnetic nanoparticles for removal of aniline from aqueous solution: equilibrium, kinetic and thermodynamic studies"; Iranian Journal of Environmental Health Sciences & Engineering, 2013, 10:19.

Liu et al; "Arsenate removal from water using Fe3O4-loaded activated carbon prepared from waste biomass"; Chemical Engineering Journal, 160 (2010) 57-62.

Lv et al; "Highly active nanoscale zero-valent iron (nZVI)-Fe3O4 nanocomposites for the removal of chromium (VI) from aqueous solutions"; Journal of Colloid and Interface Science; 369 (2012) 460-469.

Schwickardi et al; "Scalable synthesis of activated carbon with superparamagnetic properties"; Chemical Communications, 2006; 6 pages.

Tseng et al; "Synthesis of granular activated carbon/zero valent iron composites for simultaneous adsorption/dechlorination of trichloroethylene"; Journal of Hazardous Materials; 192 (2011) 500-506.

Wang et al; "Performance of an activated carbon honeycomb supported V2O5 catalyst in simultaneous SO2 and NO removal"; Chemical Engineering Science; 59 (2004) 5283-5290.

PCT/US2015/041298 Search Report dated Oct. 7, 2015.

X. Lv, et al., "Highly Active Nanoscale Zero-valent Iron (nZVI)-$Fe_3O_4$ Nanocomposites for the Removal of Chromium (VI) from Aqueous Solutions", *Journal of Colloid and Interface Science*, 2012, vol. 369, pp. 460-469.

H.H. Tseng, et al., "Synthesis of Granular Activated Carbon/Zero Valent Iron Composites for Simultaneous Adsorption/Dechlorination of Trichloroethylene", *Journal of Hazardous Materials*, 2011, vol. 192, No. 2, pp. 500-506.

Laura B. Hoch, et al., "Carbothermal Synthesis of Carbon-supported Nanoscale Zero-valent Iron Particles for the Remediation of Hexavalent Chromium", Environmental Science Technology, 2008, vol. 42, No. 7, pp. 2600-2605.

\* cited by examiner

METHOD FOR MAKING ACTIVATED CARBON-SUPPORTED TRANSITION METAL-BASED NANOPARTICLES

FIELD OF THE DISCLOSURE

The present disclosure relates generally to methods for making activated carbon-supported transition metal-based nanoparticles and methods for treating water and other industrial process streams using the activated carbon-supported transition metal-based nanoparticles.

BACKGROUND

Environmental remediation processes are useful in a wide variety of industrial applications, ranging from mining and coal applications to the treatment of groundwater, wastewater, and other industrial process streams. Regulations for controlling the discharge of industrial wastewater containing dissolved concentrations of heavy metals to the environment are being tightened due to concern for the presence of heavy metals in surface waters such as streams, rivers, and lakes. Heavy metal contaminants may include, for example, cadmium, chromium, copper, lead, mercury, nickel, zinc, and semi-metals such as arsenic and selenium. High levels of these metals in the environment can be detrimental to a variety of living species and ingestion of these metals by humans may cause accumulative poisoning, cancer, nervous system damage, and/or death. It is therefore desirable to treat wastewater to completely remove or reduce the amount of heavy metals to a safer level for both humans and animals prior to discharge into the environment.

Coal-fired power plants and waste incinerators may produce waste streams with high levels of heavy metals. Wastewater from power plants including flue gas desulfurization (FGD) systems may present a challenge due to the presence of mercury, selenium, and arsenic in the purge stream. Conventional treatment processes for removing heavy metals from water can be based on chemical precipitation and coagulation followed by conventional filtration, but these methods may not reduce metal concentrations to levels low enough to meet stringent drinking water standards.

Transition metal-based nanoparticles, such as zero-valent iron nanoparticles (ZVIN) and magnetite, have emerged as an alternative for environmental remediation due to their high surface area and high reactivity. Because transition metal-based nanoparticles possess various chemical properties derived from their different oxidation states, they have the ability to degrade a wide variety of toxic pollutants in soil and water, such as perchloroethene (PCE), trichloroethene (TCE), carbon tetrachloride (CT), nitrate, energetic munitions such as TNT and RDX, legacy organohalide pesticides such as lindane and DDT, as well as heavy metals such as chromium, lead, mercury, cadmium, and other inorganics such as selenium and arsenic. Processes employing transition metal-based nanoparticles may also provide cost savings as compared to conventional pump-and-treat or permeable reactive barrier methods.

Despite advances in transition metal-based remediation technology, such processes are not widely used in the industry due to several disadvantages, such as high operating costs, reuse and recovery difficulties, and/or aggregation effects on capacity and reactivity. These drawbacks can add complexity and cost to the overall remediation process. To address one or more of the disadvantages mentioned above, several methods have been developed to immobilize the transition metal-based nanoparticles on supports such as silica, sand, alumina, titania, and zeolite, to name a few. However, much like free-standing transition metal-based nanoparticles, these supports also require a follow-up filtration after use. Filtration methods such as membrane filtration reverse osmosis, electrodialysis reversal, and nanofiltration can be expensive and difficult to operate.

Moreover, the known methods for synthesizing transition metal-based nanoparticles, such as chemical vapor deposition, inert gas condensation, pulsed laser ablation, spark discharge generation, sputtering gas aggregation, thermal decomposition, thermal reduction of oxide compounds, hydrogenation of metallic complexes, and aqueous reduction of iron salts, tend to employ expensive reagents, produce large volumes of hydrogen gas, consume large amounts of energy, and/or cannot be scaled up for industrial application due to aggregation.

Carbothermal reduction methods may, for example, be used for the large scale production of various metals and alloys. For example, silicon, ferrosilicon, aluminum, iron, steel, and tungsten may be produced by reduction of metal oxides with a carbonaceous reducing agent in an electric arc furnace. Thermal energy is used to decompose the carbonaceous materials, which in turn drives the reduction of the metal oxide particles. The reaction is attractive as a scalable process because it is endothermic and yields only gaseous by-products. Carbothermal reduction methods may potentially be employed for the economical manufacture of transition metal-based nanoparticles. However, carbothermal methods for processing free-standing transition metal-based nanoparticles still suffer from other drawbacks mentioned above, and therefore do not offer a completely feasible solution for the production of transition metal-based nanoparticles.

Accordingly, it would be advantageous to provide an efficient, cost-effective, easily operable, and/or scalable process for making transition metal-based nanoparticles. The resulting transition metal-based nanoparticles can be used in a wide variety of environmental remediation applications, such as groundwater and wastewater treatment.

SUMMARY

The disclosure relates, in various embodiments, to methods for making an activated carbon support comprising transition metal-based nanoparticles, comprising (a) impregnating activated carbon with at least one transition metal-containing compound, and (b) heating the impregnated activated carbon in an inert atmosphere at a temperature and for a time sufficient to carbothermally reduce the transition metal-containing compound. Also disclosed herein are activated carbon supports comprising transition metal-based nanoparticles produced by such methods. Further disclosed herein are methods for treating water and waste streams, comprising contacting the water or waste streams with the activated carbon support comprising transition metal-based nanoparticles.

Activated carbon-supported transition metal-based nanoparticles produced as set forth herein may provide a high surface area useful for the efficient removal of heavy metals and other contaminants via reduction and adsorption. Moreover, the products may have different shapes, which can be easily recycled and reactivated. Additionally, products having different oxidation states may be created by controlling the starting materials and/or the processing parameters, such as concentration, temperature, and time. Finally, impregnation of the activated carbon with the transition metal-containing compounds may allow for the immobilization of the transition metal particles in an activated carbon structure, which may prevent agglomeration and bulk oxidation issues that typically arise in the case of free-standing transition metal-based nanoparticles. It should be noted, however, that one or more of such characteristics may not be present according to various embodiments of the disclosure, yet such embodiments are intended to fall within the scope of the disclosure.

Additional features and advantages of the invention will be set forth in the detailed description which follows, and in part will be readily apparent to those skilled in the art from that description or recognized by practicing the invention as described herein, including the detailed description which follows, the claims, and the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the invention.

BRIEF DESCRIPTION OF THE DRAWINGS

The following detailed description can be best understood when read in conjunction with the following drawings, where like structures are indicated with like reference numerals and in which.

DETAILED DESCRIPTION

Disclosed herein are methods for making an activated carbon support comprising transition metal-based nanoparticles, comprising (a) impregnated activated carbon with at least one transition metal-containing compound, and (b) heating the impregnated activated carbon in an inert atmosphere at a temperature and for a time sufficient to carbothermally reduce the transition metal-containing compound. Also disclosed are activated carbon-supported transition metal-based nanoparticles prepared according to the methods disclosed herein, and methods for treating waste or water streams using the activated carbon-supported transition metal-based nanoparticles.

Materials

As used herein, the term "activated carbon" denotes one or more carbon materials that have been treated to increase the surface area, such as by the formation of pores within the carbon. The activation of carbon may be carried out physically or chemically, according to methods known in the art. Activated carbon useful in the context of the instant disclosure may comprise, by way of non-limiting example, greater than about 90% activated carbon, such as greater than about 95% by weight activated carbon, or greater than about 99% by weight activated carbon. It is to be understood that the activated carbon may comprise small amounts, e.g., less than about 10% by weight, of carbon precursor materials that are not fully activated during the activation process and/or various other inorganic or organic impurities.

According to various embodiments, the activated carbon may be derived from carbon precursors, carbonized materials, and mixtures thereof. For example, the activated carbon may be derived from natural materials such as nut shells, wood, sawdust, biomass, and non-lignocellulosic sources. In other embodiments, the activated carbon can be derived from edible grains such as wheat flour, walnut flour, pecan flour, cherry pit flour, corn flour, corn starch, corn meal, rice flour, and potato flour. Other non-limiting examples of carbon precursors include rice hulls, coconut husks, beets, millet, soybean, barley, and cotton. The activated carbon can be derived from a crop or plant that may or may not be genetically-engineered. Carbonized materials may include, for example, coal, graphite, and coke, or any carbonized material derived from a carbon precursor disclosed herein.

Further exemplary carbon precursors and associated methods of forming carbonized materials are disclosed in commonly-owned U.S. Pat. Nos. 8,198,210, 8,318,356, and 8,482,901, and U.S. Patent Application Publication No. 2010/0150814, all of which are incorporated herein by reference in their entireties. Methods for forming activated carbon are disclosed, for example, in U.S. Pat. Nos. 5,820,962 and 8,741,243, which are incorporated herein by reference in their entireties.

The activated carbon may be in any suitable form or shape capable of being impregnated with transition metal-based nanoparticles. By way of non-limiting example, the activated carbon may be an activated carbon body in the form of, e.g., granules, pellets, monoliths, rods, honeycombs, fibers, ribbons, and cloths, to name a few. According to various embodiments, the activated carbon is a honeycomb body.

Suitable transition metal-containing compounds may comprise, for example, salts and/or oxides of one or more transition metals and combinations thereof. The transition metals may be chosen from any metals having more than one oxidation state, for instance, iron, zinc, titanium, nickel, copper, zirconium, cobalt, manganese, as well as combinations thereof. The transition metals may, in various embodiments, be in any oxidation state greater than zero, for instance +1, +2, +3, +4, +5, +6, +7, or +8, and combinations thereof. Suitable salts may include, for example, oxalates, nitrates, nitrites, halides such as chlorides and fluorides, sulfates, phosphates, carbonates, and citrates, hydrates thereof, and combinations thereof. Non-limiting examples of transition metal-containing compounds include the salts and oxides of Fe(II), Fe(III), Cu(I), Cu(II), Ti(IV), Co(II), Co(III), Co(IV), Ni(II), Ni(IV), Zn(II), Mn(II), Mn(IV), and Zr(IV). For example, the transition metal-containing compounds may comprise Fe(II) oxalate, $FeCO_3$, $Fe(NO_3)_3$, $FeCl_3$, $Fe_2O_3$, $Fe_3O_4$, $Zr(SO_4)_2$, $ZrO(NO_3)_2$, $MnO_2$, hydrates thereof, and combinations thereof.

In various exemplary embodiments, the transition metal-containing compound may be provided as a feedstock mixture, which may comprise at least one other known component useful for mixing, forming, activating, carbothermally reducing, or firing the activated carbon-supported transition metal-based nanoparticles. For example, the feedstock mixture may further comprise at least one additional component chosen from solvents and chemical oxidizing agents such as phosphoric acid.

Solvents may, for example, be used to wet or dissolve the transition metal-containing compound and/or other feedstock components. In various exemplary embodiments, the at least one solvent may be aqueous, for example water and water-miscible solvents, or organic solvents, or any combination thereof. The at least one solvent may be present in the feedstock mixture in an amount ranging from about 10% to about 90% by weight, such as from about 25% to about 80% by weight, from about 40% to about 75% by weight, or from about 50% to about 60% by weight, including all ranges and sub-ranges therebetween.

Methods

Activated carbon may be impregnated with the transition metal-containing compound using a variety of methods. In certain non-limiting embodiments, activated carbon may be pre-dried before impregnation. For example, the activated carbon may be pre-dried at a temperature ranging from about 50° C. to about 200° C., e.g., at about 120° C., for a time period of at least about 2 hours, e.g., ranging from about 2 hours to about 24 hours or more, such as from about 4 hours to about 12 hours, including all ranges and sub-ranges therebetween.

In various embodiments, the transition metal-containing compound may be incorporated as an aqueous solution, and the concentration of the solution may range from about 10 to about 90 wt %. For instance, a transition metal-containing compound, such as a salt or oxide, may be dissolved in water, e.g., deionized water, or any other suitable solvent, to form a solution. The activated carbon may then be impregnated or coated with the transition metal-containing feedstock solution. By way of non-limiting example, the activated carbon may be immersed or submerged in the transition metal-containing solution. According to various embodiments, the activated carbon may be soaked in the transition metal-containing solution for a time sufficient to allow the transition metal-containing compound to permeate the activated carbon structure, e.g., such that the pore walls of the activated carbon are sufficiently impregnated with the transition metal-containing compound. The soaking time may vary depending on the form of the activated carbon but can range, in some embodiments, from about 5 minutes to about 60 minutes, e.g., from about 10 minutes to about 50 minutes, or from about 20 minutes to about 40 minutes, including all ranges and sub-ranges therebetween.

Various alternative methods for impregnated the activated carbon with the transition metal-containing compound may be used and are envisioned to obtain an impregnated activated carbon body. These alternatives are within the ability of one skilled in the art and are intended to fall within the scope of this disclosure.

The activated carbon and transition metal-containing compound may be combined in any suitable ratio to form the impregnated activated carbon. The specific concentrations and component ratios may depend, for example, on the physical form and type of each component and their concentration, if one or more components are in the form of a mixture or solution. By way of non-limiting example, the activated carbon may be impregnated with the at least one transition metal-containing compound so as to obtain a transition metal-containing compound loading, e.g., salt and/or oxide loading, ranging from about 5% to about 50% by weight, such as from about 10% to about 40% by weight, from about 15% to about 35% by weight, from about 20% to about 30% by weight, or about 25% by weight, including all ranges and sub-ranges therebetween.

The impregnated activated carbon may be optionally dried. For instance, the impregnated activated carbon may be dried using ambient air, humid air, and/or hot air, or may be dried by dielectric drying, microwave drying, reduced pressure drying, vacuum drying, and/or freeze drying. According to various embodiments, the impregnated activated carbon may be dried at a temperature ranging from about 50° C. to about 200° C., such as from about 80° C. to about 150° C., or from about 90° C. to about 120° C., including all ranges and sub-ranges therebetween. The drying time may range, for example, from about 1 hour to about 24 hours or more, such as from about 2 hours to about 12 hours, from about 3 hours to about 10 hours, or from about 4 hours to about 8 hours, including all ranges and sub-ranges therebetween. By way of non-limiting example, the impregnated activated carbon may be air dried at a temperature ranging from about 80° C. to about 120° C. until the sample weight reaches a relatively constant value.

In various exemplary embodiments, the impregnated activated carbon may then be heat treated to carbothermally reduce the transition metal-containing compound. As used herein, "carbothermal reduction," "carbothermally reduce," "carbothermally reduced" and variations thereof are intended to denote that the transition metal-containing compound is partially, substantially, or, in some embodiments, completely reduced so as to form a zero-valent transition metal and/or transition metal oxide. By way of non-limiting example, an Fe(III) salt may be reduced either to an iron oxide (FeO or $Fe_3O_4$) or to zero-valent iron ($Fe^0$). Similar reductions using other transition metals are envisioned and within the scope of the disclosure.

It is within the ability of one skilled in the art to determine the appropriate method and conditions for the carbothermal reduction, such as, for example, firing conditions including equipment, temperature, and duration. Such methods and conditions may depend, for example, upon the size and composition of the impregnated activated carbon, as well as the desired properties of the resulting product.

By way of non-limiting example, the impregnated activated carbon may be heat treated in an inert atmosphere. Examples of inert gases include one or more of nitrogen, helium, argon, krypton, neon, and xenon. According to various embodiments, the carbothermal reduction may take place in the absence of a reducing gas, such as hydrogen, forming gas or methane. The activated carbon itself may serve as a reducing agent, thus providing electrons to reduce at least a portion of the transition metal-containing feedstock. In other exemplary embodiments, a reducing gas may be present during the carbothermal reduction process.

The impregnated activated carbon can be heated, for example, at a temperature ranging from about 500° C. to about 1000° C. (e.g., about 500, 550, 600, 650, 700, 750, 800, 850, 900, 950 or 1000° C., and all ranges and sub-ranges therebetween) for a predetermined time (e.g., about 0.5, 1, 2, 4, 5, 8, 10 or more hours, and all ranges and sub-ranges therebetween). In various embodiments, the heat treatment may be performed using a furnace, such as a retort furnace, or by heating within a microwave reaction chamber using microwave energy. For instance, the impregnated activated carbon may be heat treated using an AC or DC electric arc furnace.

During the heat treatment step, the transition metal-containing compound is carbothermally reduced to form a zero-valent transition metal and/or a transition metal oxide. An activated carbon support comprising transition metal oxide or zero-valent transition metal nanoparticles can thus be produced using the methods disclosed herein.

After heat treatment, the activated carbon support comprising transition metal-based nanoparticles may be optionally further treated, for example, the support may be cooled, rinsed with water, treated with acid, and/or stored under ambient or inert conditions. In certain embodiments, the support may be cooled and/or stored in an inert atmosphere to prevent oxidation. In other embodiments, the support may be treated with acid prior to use, to remove any oxidized layer that may have formed on the support during storage. For instance, if the support is stored under ambient conditions, it may be acid treated prior to use, for example, by treating the support with hydrochloric acid. The concentration of the acid and the treatment time will vary depending on the support and the conditions under which it was stored.

Activated Carbon-Supported Transition Metal-Based Nanoparticles

The disclosure also relates to activated carbon supports comprising transition metal-based nanoparticles produced according to the methods disclosed herein. Such supports may have any desired shape or size, including granules, pellets, honeycombs, monoliths, rods, fibers, cloths, and ribbons. In other embodiments, after impregnation and firing, the support may be ground into a powder to increase the surface interaction with the water or waste stream to be treated.

By way of non-limiting example, the activated carbon-supported transition metal-based nanoparticles may comprise activated carbon particles having, for instance, an average particle size of less than about 100 microns, for instance, less than about 75, 50, 25, 10, or 5 microns, including all ranges and sub-ranges therebetween. In various embodiments, the activated carbon may have an average particle size of less than about 5 microns, such as less than about 4, 3, 2, or 1 microns, including all ranges and sub-ranges therebetween. In further embodiments, the average particle size of the activated carbon may range from about 0.5 to about 25 microns, such as from about 0.5 microns to about 5 microns.

The activated carbon can comprise micro-, meso- and/or macroscale porosity. As defined herein, microscale pores have a pore size of about 2 nm or less and ultra-microscale pores have a pore size of about 1 nm or less. Mesoscale pores have a pore size ranging from about 2 to about 50 nm. Macroscale pores have a pore size greater than about 50 nm. In one embodiment, the activated carbon comprises a majority of microscale pores.

As used herein, the term "microporous carbon" and variants thereof means an activated carbon having a majority (i.e., at least 50%) of microscale pores. A microporous, activated carbon material can comprise greater than 50% microporosity (e.g., greater than about 50, 55, 60, 65, 70, 75, 80, 85, 90 or 95% micro porosity). According to certain embodiments, the activated carbon may have a total porosity of greater than about 0.2 $cm^3/g$ (e.g., greater than about 0.2, 0.25, 0.3, 0.35, 0.4, 0.45, 0.5, 0.55, 0.6, 0.65 or 0.7 $cm^3/g$). The portion of the total pore volume resulting from micropores ($d \leq 2$ nm) can be about 90% or greater (e.g., at least about 90, 94, 94, 96, 98 or 99%) and the portion of the total pore volume resulting from micropores ($d \leq 1$ nm) can be about 50% or greater (e.g., at least about 50, 55, 60, 65, 70, 75, 80, 85, 90 or 95%). The activated carbon may have a total surface area ranging, for example, from about 200 $m^2/g$ to about 10,000 $m^2/g$, such as from about 500 $m^2/g$ to about 5,000 $m^2/g$, or from about 1,000 $m^2/g$ to about 3,000 $m^2/g$, including all ranges and sub-ranges therebetween.

According to various embodiments, the carbon-supported transition metal-based nanoparticles consist of activated carbon and transition metal-based nanoparticles. In other embodiments, the carbon-supported transition metal-based nanoparticles consist essentially of activated carbon and transition metal-based nanoparticles. In certain embodiments, the carbon-supported transition metal-based nanoparticles may include carbon precursor materials that are not fully activated and/or various organic or inorganic impurities that do not burn out during the heat treatment step. According to various embodiments, the carbon-supported transition metal-based nanoparticles may comprise up to, for instance, about 10% by weight of such precursors and/or impurities, such as up to about 5%, up to about 4%, up to about 3%, up to about 2%, up to about 1%, up to about 0.5%, or up to about 0.1 by weight of carbon precursors and/or impurities.

The activated carbon support may, in certain embodiments, comprise the transition metal-based nanoparticles in a concentration ranging, for example, from about 1% to about 40% by weight (e.g., about 5%, 10%, 15%, 20%, 25%, 30%, 35%, or 40%), such as from about 15% to about 35%, from about 10% to about 30%, or from about 5% to about 25% by weight, including all ranges and sub-ranges therebetween. According to various embodiments, the activated carbon-supported transition metal-based nanoparticles may consist essentially of activated carbon and nanoparticles of at least one zero-valent transition metal and at least one transition metal oxide. In other embodiments, the activated carbon-supported transition metal-based nanoparticles may consist essentially of activated carbon and nanoparticles of at least one zero-valent transition metal. According to further embodiments, the activated carbon-supported transition metal-based nanoparticles may consist essentially of activated carbon and nanoparticles of at least one transition metal oxide. In still further embodiments, the activated carbon-supported transition metal-based nanoparticles may consist essentially of activated carbon and at least one of a zero-valent transition metal, a transition metal oxide, and a transition metal carbide.

As discussed above, the transition metal-containing compound may be varied such that the resulting activated carbon support is impregnated with different types and concentrations of transition metal-based nanoparticles. For example, the final product may be impregnated with about 1% to about 100% by weight of nanoparticles of at least one zero-valent transition metal, based on the total weight of transition metal-based nanoparticles impregnated on the support, such as from about 5% to about 90%, or from 10% to about 80%, from about 15% to about 70%, from about 20% to about 60%, from about 25% to about 50%, or from about 30% to about 40% by weight, including all ranges and sub-ranges therebetween. In various embodiments, the final product may be impregnated with about 1% to about 100% by weight of nanoparticles of at least one transition metal oxide, based on the total weight of transition metal-based nanoparticles impregnated on the support, such as from about 5% to about 90%, or from 10% to about 80%, from about 15% to about 70%, from about 20% to about 60%, from about 25% to about 50%, or from about 30% to about 40% by weight, including all ranges and sub-ranges therebetween.

As used herein, the term "nanoparticles" is meant to denote particles having a size less than one micron, for example, ranging from about 1 nm to about 999 nm, such as from about 10 nm to about 900 nm, from about 50 nm to about 800 nm, from about 100 nm to about 700 nm, from about 150 nm to about 600 nm, from about 200 nm to about 500 nm, or from about 300 nm to about 400 nm, including all ranges and sub-ranges therebetween.

In certain embodiments, the transition-metal based nanoparticles are dispersed throughout the activated carbon matrix. For example, the transition-metal based nanoparticles may be homogenously distributed throughout the activated carbon matrix. In certain embodiments, the transition metal-based nanoparticles are embedded and/or enveloped in the activated carbon matrix such that at least a portion of the nanoparticles are exposed, for instance, able to interact with, bind to, and/or adsorb various impurities to which they may be exposed.

Activated carbon-supported transition metal-based particles as produced herein can be used to treat a wide variety of water and waste streams, such as groundwater, standing water, drinking water, and wastewater. Numerous industrial process streams can also be treated, such as aqueous industrial waste streams. Such streams may be treated by bringing them into contact with the activated carbon-supported transition metal-based particles disclosed herein. According to various embodiments, the transition metal-based nanoparticles are distributed throughout an activated carbon support, which can be added to the stream for a time period sufficient to remove or reduce the concentration of the targeted impurity. Impurities can include, for example, toxic pollutants in soil and water, such as PCE, TCE, CT, nitrate, TNT, RDX, lindane, DDT, chromium, lead, mercury, cadmium, selenium, and arsenic.

Treatment times will vary depending on the type and amount of impurity present in the stream to be treated. By way of non-limiting example, the contact time may range from less than about 1 minute to greater than about 24 hours, for instance, from about 30 minutes to about 24 hours, such as from about 1 hour to about 20 hours, from about 4 hours to about 18 hours, from about 6 hours to about 16 hours, or from about 8 hours to about 12 hours, including all ranges and sub-ranges therebetween.

After use, the activated carbon-supported transition metal-based nanoparticles may be optionally recovered from the treated stream and recycled for future use. For example, the used product can be reactivated by heat treating it to carbothermally reduce the transition metal-based nanoparticles back to a lower oxidation state or a zero valent state. The reactivated carbon support comprising transition metal-based nanoparticles can then be used repeatedly to treat other streams.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the articles "the," "a," or "an," mean "at least one," and should not be limited to "only one" unless explicitly indicated to the contrary. Thus, for example, reference to "a solvent" includes examples having two or more such "solvents" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Other than in the Examples, all numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a temperature greater than 50° C." and "a temperature greater than about 50° C." both include embodiments of "a temperature greater than about 50° C." as well as "a temperature greater than 50° C."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a feedstock mixture that comprises a transition metal-based compound include embodiments where a feedstock mixture consists of a transition metal-based compound, and embodiments where a feedstock mixture consists essentially of a transition metal-based compound.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Example 1

Figure 1:
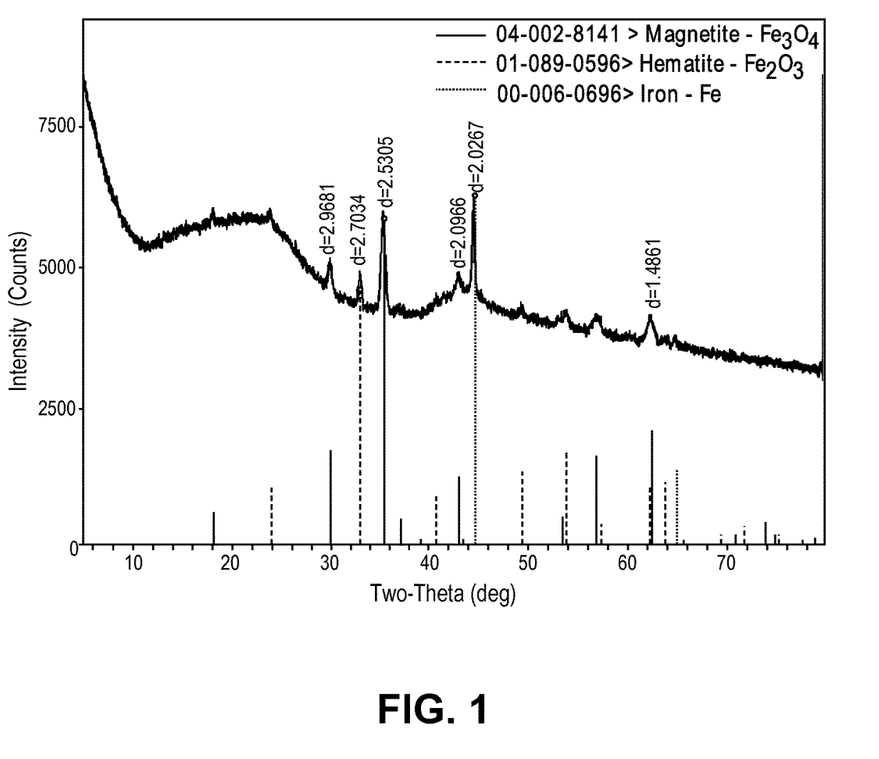
FIG. 1 is the XRD spectrum of an activated carbon support comprising iron-based nanoparticles produced according to one embodiment of the disclosure.

A transition metal-containing solution was prepared by dissolving 64 g $FeCl_3.6H_2O$ and 36 g $Fe(NO_3)_3.9H_2O$ in 100 ml of deionized water. 2 g of pre-dried (130° C., 1 hour) activated carbon honeycomb (ACH) was immersed in the solution to obtain an Fe salt loading of 25 wt % (0.5 g Fe salt/2 g ACH). The ACH sample was allowed to soak in the solution for 10 minutes, at which time the sample was removed and placed in an oven set at 100° C. The impregnated ACH sample was dried until there was no significant change in sample weight. The sample was then transferred to a retort furnace, gradually heated to 700° C. in an inert nitrogen atmosphere, and held there for 4 hours. After heating, the sample was allowed to cool to room temperature in the furnace under a nitrogen flow and was subsequently removed from the furnace for X-ray diffraction (XRD) analysis and heavy metal adsorption testing. FIG. 1 is the XRD spectrum of the sample, indicating that the primary transition metal phases are $Fe_3O_4$, $Fe^0$, and $Fe_2O_3$.

The sample was tested in real flue gas desulfurization (FGD) wastewater to evaluate its heavy metal removal performance. The ACH sample was immersed in 45 ml of FGD wastewater containing 30 ppb As, 200 ppb Cd, 2.5 ppm Se, 160 ppb Hg, 220 ppm sulfate, 100 ppm nitrate, 31 ppm chloride, 58 ppm calcium, 17 ppm magnesium, and 11 ppm sodium. The solution was agitated using a mechanical shaker (Barnstead LABQUAKE tube Shaker from Thermo Scientific) for 16 hours. The amounts of adsorbed metal ions were calculated by measuring the difference between their concentrations before and after adsorption. Table I demonstrates that the sample was effective in removing both metal cations (Hg and Cd) and anions (As).

TABLE I

Metal Removal Performance of Fe-AC Honeycomb (Example 1)

| | Concentration | |
|---|---|---|
| Toxic Metal | Before | After |
| Arsenic (As) | 30 ppb | 5 ppb |
| Cadmium (Cd) | 220 ppb | 31 ppb |
| Mercury (Hg) | 160 ppb | 2 ppb |
| Selenium (Se) | 2.56 ppm | 2.45 ppm |

Example 2

Figure 2:
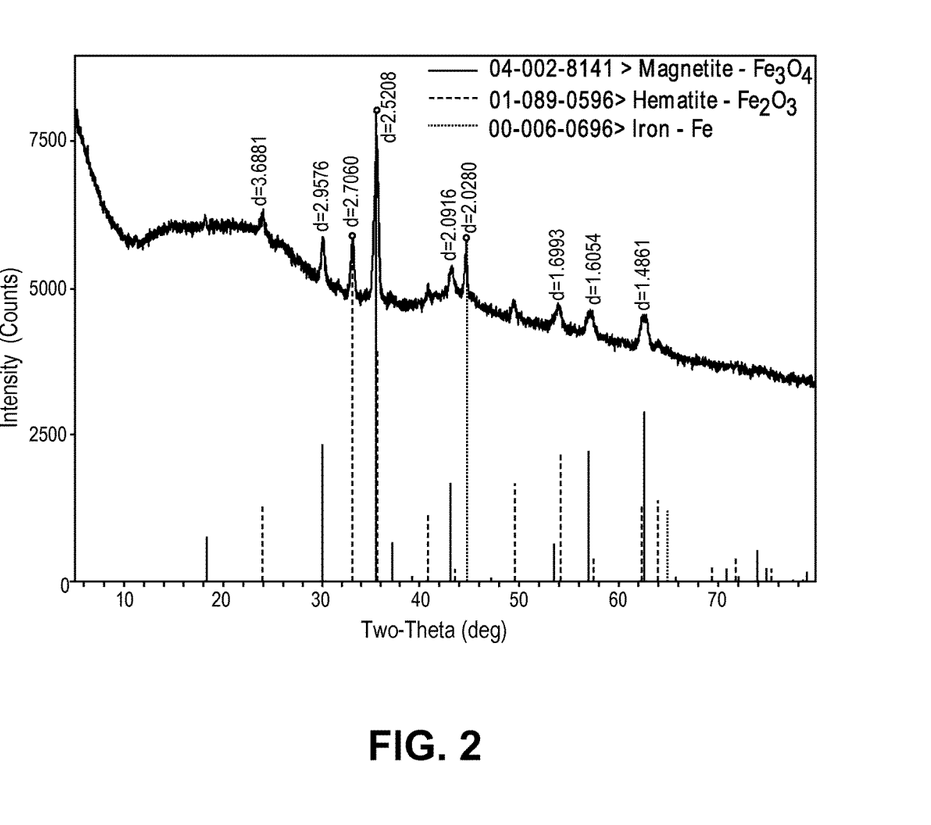
FIG. 2 is the XRD spectrum of an activated carbon support comprising iron-based nanoparticles produced according to one embodiment of the disclosure.

A transition metal-containing solution was prepared by dissolving 100 g $Fe(NO_3)_3 \cdot 9H_2O$ in 100 ml of deionized water. 1.89 g of pre-dried (130° C., 1 hour) activated carbon honeycomb (ACH) was immersed in the solution to obtain an Fe salt loading of 35 wt %. The ACH sample was allowed to soak in the solution for 20 minutes, at which time the sample was removed and placed in an oven set at 80° C. The impregnated ACH sample was dried until there was no significant change in sample weight. The sample was carbothermally reduced and analyzed in a manner similar to that set forth in Example 1. FIG. 2 is the XRD spectrum of the sample, indicating that the primary transition metal phases are $Fe_3O_4$, $Fe_2O_3$, and $Fe^0$. The results of the heavy metal adsorption testing are presented in Table II below, which demonstrates that the sample was effective in removing both metal cations (Hg and Cd) and anions (As).

TABLE II

Metal Removal Performance of Fe-AC Honeycomb (Example 2)

| | Concentration | |
|---|---|---|
| Toxic Metal | Before | After |
| Arsenic (As) | 30 ppb | 5 ppb |
| Cadmium (Cd) | 220 ppb | 9 ppb |
| Mercury (Hg) | 160 ppb | <1 ppb |
| Selenium (Se) | 2.56 ppm | 2.55 ppm |

Example 3

Figure 3:
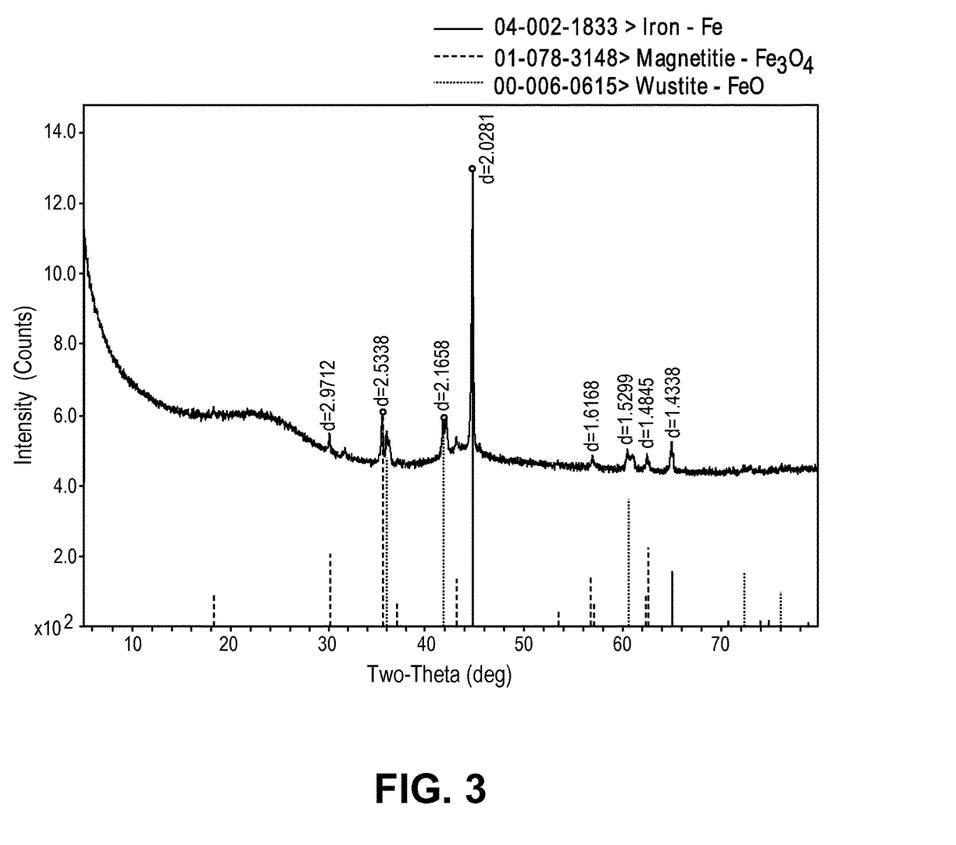
FIG. 3 is the XRD spectrum of an activated carbon support comprising iron-based nanoparticles produced according to one embodiment of the disclosure.

A transition metal-containing solution was prepared by dissolving 50 g $Fe(NO_3)_3 \cdot 9H_2O$ in 100 ml of deionized water. 1.95 g of pre-dried (130° C., 1 hour) activated carbon honeycomb (ACH) was immersed in the solution to obtain an Fe salt loading of 10 wt %. The sample was impregnated, dried, carbothermally reduced, and analyzed in a manner similar to that set forth in Example 2. FIG. 3 is the XRD spectrum of the sample, indicating that the primary transition metal phases are $Fe^0$, FeO, and $Fe_3O_4$. The results of the heavy metal adsorption testing are presented in Table III below, which demonstrates that the sample was effective in removing both metal cations (Hg and Cd) and anions (As and Se).

TABLE III

Metal Removal Performance of Fe-AC Honeycomb (Example 3)

| | Concentration | |
|---|---|---|
| Toxic Metal | Before | After |
| Arsenic (As) | 30 ppb | <5 ppb |
| Cadmium (Cd) | 220 ppb | <5 ppb |
| Mercury (Hg) | 160 ppb | <1 ppb |
| Selenium (Se) | 2.56 ppm | 1.2 ppm |

Example 4

Figure 4:
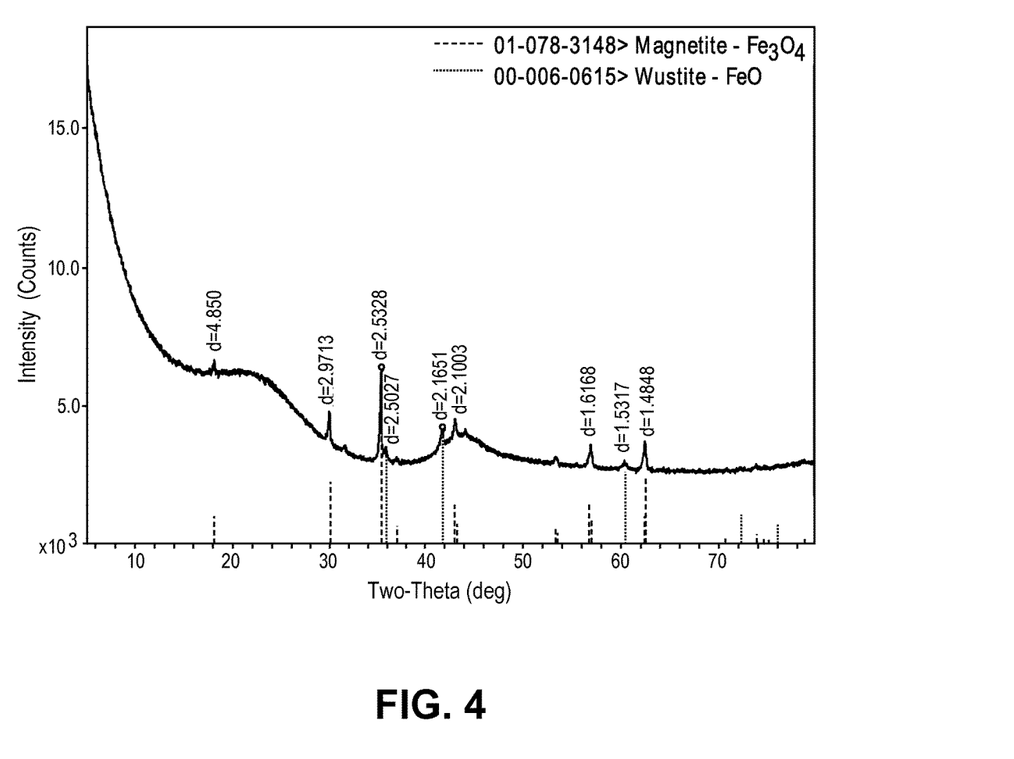
FIG. 4 is the XRD spectrum of an activated carbon support comprising iron-based nanoparticles produced according to one embodiment of the disclosure.

A transition metal-containing solution was prepared by dissolving 50 g $FeCl_3 \cdot 6H_2O$ in 100 ml of deionized water. 0.85 g of pre-dried (130° C., 1 hour) activated carbon honeycomb (ACH) was immersed in the solution to obtain an Fe salt loading of 20 wt %. The sample was impregnated, dried, carbothermally reduced, and analyzed in a manner similar to that set forth in Example 2. FIG. 4 is the XRD spectrum of the sample, indicating that the primary transition metal phases are $Fe_3O_4$ and FeO. Listed also in FIGS. 1-4 are the International Centre for Diffraction Data Powder Diffraction File (PDF-4) reference numbers for the identified phases.

Moreover, as discussed throughout the disclosure, by varying the identity and/or concentration of the transition metal-containing compound, activated carbon supports comprising transition metal-based nanoparticles with varying valences and identities may be produced. Table IV below illustrates the different activated carbon supports produced according to the different methods of Examples 1 to 4.

TABLE IV

Starting Compositions and Resulting Transition Metal Phases for Examples 1-4

| Example | $FeCl_3 \cdot 6H2O$ (wt %) | $Fe(NO_3)_3 \cdot 9H_2O$ (wt %) | Fe Salt Loading (wt %) | Fe Phases Relative wt % |
|---|---|---|---|---|
| 1 | 64 | 36 | 25 | Iron, Fe: 37%<br>Magnetite, $Fe_3O_4$: 45%<br>Hematite, $Fe_2O_3$: 18% |
| 2 | 0 | 100 | 35 | Fe: 13%<br>$Fe_3O_4$: 55%<br>$Fe_2O_3$: 32% |
| 3 | 0 | 100 | 10 | Fe: 57%<br>$Fe_3O_4$: 13%<br>Wustite, FeO: 30% |
| 4 | 100 | 0 | 20 | FeO: 30%<br>$Fe_3O_4$: 70% |

What is claimed is:

1. A method for making activated carbon honeycomb-supported transition metal-based nanoparticles, the method comprising:

impregnating an activated carbon honeycomb with at least one transition metal-containing compound;

heating the impregnated activated carbon honeycomb in an inert atmosphere at a temperature and for a time sufficient for the activated carbon honeycomb to reduce the at least one transition metal-containing compound; and treating the activated carbon honeycomb-supported transition metal-based nanoparticles with acid;

wherein the activated carbon honeycomb-supported transition metal-based nanoparticles are present in a concentration ranging from about 5% to about 40% by weight.

2. The method of claim 1, wherein the at least one transition metal is chosen from iron, zinc, titanium, nickel, copper, zirconium, hafnium, vanadium, niobium, cobalt, manganese, platinum, aluminum, barium, bismuth, and combinations thereof.

3. The method of claim 1, wherein the at least one transition metal-containing compound is chosen from transition metal salts and oxides, and combinations thereof.

4. The method of claim 1, wherein the at least one transition metal-containing compound is chosen from $FeC_2O_4$, $FeCO_3$, $Fe(NO_3)_3$, $Fe_2O_3$, $Fe_3O_4$, $FeCl_3$, $Zr(SO_4)_2$, $ZrO(NO_3)_2$, $MnO_2$ hydrates thereof, and combinations thereof.

5. The method of claim 1, wherein the at least one transition metal-containing compound is mixed with at least one solvent to form a feedstock mixture.

6. The method of claim 5, wherein the at least one solvent is chosen from water, water-miscible solvents, organic solvents, and combinations thereof.

7. The method of claim 5, wherein the feedstock mixture is an aqueous solution comprising from about 10% to about 90% by weight of at least one transition metal-containing compound.

8. The method of claim 5, wherein the activated carbon honeycomb is impregnated with the at least one transition metal-containing compound by immersing the activated carbon honeycomb into the feedstock mixture with an optional soaking time ranging from about 5 to about 60 minutes.

9. The method of claim 1, further comprising drying the impregnated activated carbon honeycomb at a temperature ranging from about 50° C. to about 200° C. and for a time ranging from about 1 hour to about 24 hours.

* * * * *

UNITED STATES PATENT AND TRADEMARK OFFICE
CERTIFICATE OF CORRECTION

PATENT NO. : 10,011,503 B2
APPLICATION NO. : 14/337621
DATED : July 3, 2018
INVENTOR(S) : William Peter Addiego et al.

Page 1 of 1

It is certified that error appears in the above-identified patent and that said Letters Patent is hereby corrected as shown below:

On the Title Page

Column 2, item (56), Line 10, delete "vol. 288:" and insert -- vol. 288, --, therefor.

Column 2, item (56), Line 13, delete "dechlorinatoin" and insert -- dechlorination --, therefor.

Signed and Sealed this
Seventh Day of April, 2020

Andrei Iancu
*Director of the United States Patent and Trademark Office*